June 17, 1924.

E. V. COY 1,498,016

VEHICLE THEFT PREVENTING DEVICE

Filed March 24, 1924

Inventor:
Earnest V. Coy,
By William L. Symons
his Atty.

Patented June 17, 1924.

1,498,016

UNITED STATES PATENT OFFICE.

EARNEST V. COY, OF ST. JOSEPH, MISSOURI.

VEHICLE THEFT-PREVENTING DEVICE.

Application filed March 24, 1924. Serial No. 701,555.

*To all whom it may concern:*

Be it known that I, EARNEST V. COY, a citizen of the United States of America, residing at St. Joseph, in the county of Buchanan and State of Missouri, have invented certain new and useful Improvements in Vehicle Theft-Preventing Devices, of which the following is a specification.

My invention relates to devices for preventing the theft of vehicles.

An object of my invention is to provide means connected with the engine of an automobile which will give audible warning when the engine is operated by any unauthorized person.

A further object is the construction of a device which is locked in both operative and inoperative positions and in which the whistle element revolves from operative to inoperative position and vice versa with the control valve.

A further object of my invention is the construction of a device of few parts which are not complicated, which are easily assembled and which produce when assembled an efficient vehicle theft preventing means. With these and other objects in view one embodiment of my invention is illustrated in the accompanying drawings in which.

Figure 1:
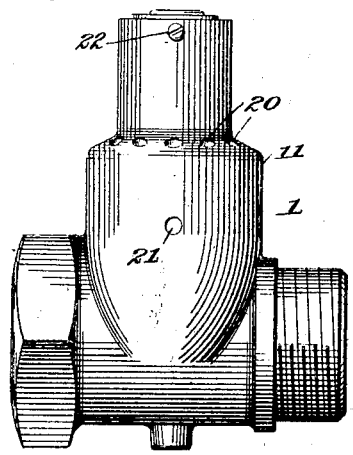
Figure 1 is a side elevation of my device.
Figure 2:
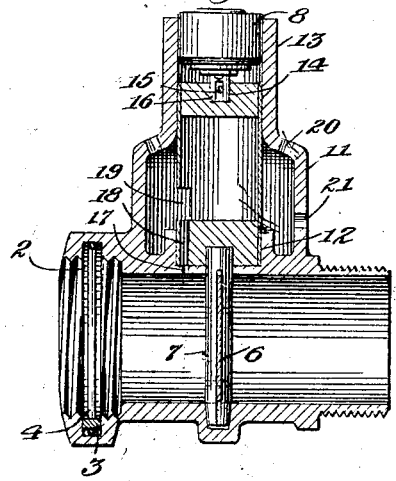
Figure 2 is a vertical, longitudinal section.
Figure 3:
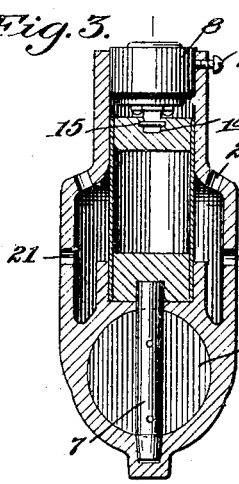
Figure 3 is a vertical, transverse section showing the valve closed.
Figure 4:
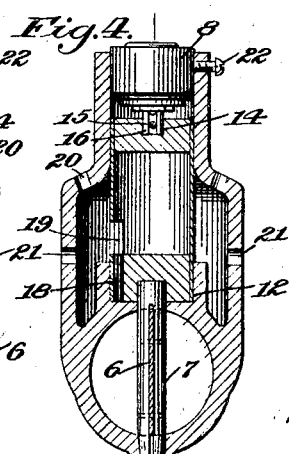
Figure 4 is a vertical, transverse section showing the valve open.

My device designated as a whole by the numeral 1 comprises a body member or nut having an opening through it with screw threads on both ends thereof, means to close the opening through the nut and a dome member rising from and integral with the body member in which is positioned the whistle member and a lock.

The larger end of the device having internal screw threads may be attached to the manifold or a pipe leading from the manifold, neither being shown, and the opposite end containing screw threads on the outside may be attached to the usual exhaust pipe, also not shown. The connection with the manifold or pipe leading therefrom is of a character to prevent the device being removed and comprises a slot 2 midway the threaded part of the nut in which is pivoted a dog 3 one end of which is pushed inwardly by a spring 4. This construction allows the device to be screwed on to the end of a manifold, but prevents its removal, for if an attempt is made to unscrew the nut, the end of the spring-pressed dog will dig into the threads on the manifold as is fully pointed out in my Patent No. 1,450,411, of April 3, 1923.

The opening through the nut is closed by a valve or damper 6 attached to a shaft 7 one end of which has a suitable bearing for rotation in the side of the body member and the other end of which is attached to a cylindrical member 10, which may have suitable plugs in each end thereof, connected to the lock 8 which is key-operated through the key opening 9. This cylindrical member extends through the dome 11 rising from and integral with the body member of the device. One end of the cylindrical member is placed to rotate in a bearing 12 in the body member and the other end in the part 13 of the dome which acts as a bearing therefor. The upper end of this cylindrical member has a depression 14 in the top thereof across which is placed a suitable piece of metal 15 which is straddled by the extension 16 of the lock 8. The lock may be of any suitable form adapted to hold the shaft controlling the valve in open or closed position. Extending from the part of the opening through the body part of the device which is located between the damper and the end of the device attached to the manifold, is a whistle opening 17 which registers with the cutaway part 18 of the plug in the lower part of the cylindrical member revolving in the dome. This cylindrical member has the usual whistle opening 19.

Suitable openings 20 are placed in the top of the dome and openings 21 in the lower part thereof.

The operation of my device will be readily understood from the above description and may be briefly stated as follows:—

Figure 5:
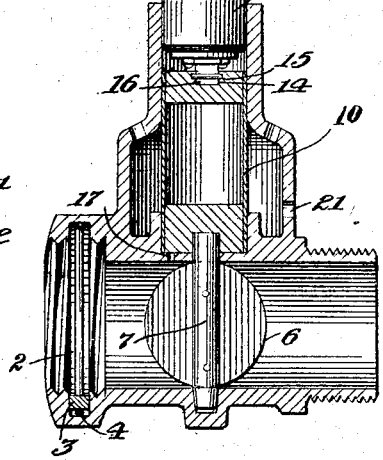
Figure 5 is a vertical, longitudinal section showing the valve open.
Figure 6:
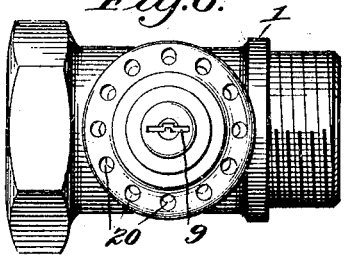
Figure 6 is a top plan view.

While the engine is operated by the owner of the car, the valve will be in the position indicated in Figure 5. When the engine is stopped, the user of the car by means of a key will operate the lock placing the whistle in operative position and the damper across the opening through the body of the device. Any attempt to use the engine when the theft preventing device is in position 2 will result in blowing the whistle, giving notice to the owner of the car that the engine is being operated by some unauthorized person. The whistle will continue to sound as long as the engine runs for it cannot be placed out of operative position except by the key-controlled lock.

Having described my invention, what I claim and desire to protect by Letters Patent is:

1. A device of the kind described comprising a body member and a dome member, said body member having an opening through it, means to attach said member to the exhaust manifold of an internal combustion engine, a damper in said opening adapted to close said opening, a shaft having end bearings in the walls of said body member, means to attach said damper to said shaft, a whistle member, one end of said whistle member being attached to said damper shaft and rotating in a bearing in said body member and the other end rotating in the dome as a bearing, a lock and a connection between said lock and said whistle member and said body member having a second opening through it by which said whistle is operated when said damper is rotated to close the first mentioned opening through said body member.

2. A device of the kind described comprising a body member and a dome member, said body member having an opening through it, means to attach said member to the exhaust manifold of an internal combustion engine, a damper in said opening adapted to close said opening, a shaft having end bearings in the walls of said body member, means to attach said damper to said shaft, a cylindrical whistle member having plugs in the ends thereof, one end of said whistle member being attached to said damper shaft and rotating in a bearing in said body member and the other end rotating in the dome as a bearing, a lock and a connection between said lock and said whistle member and said body member having a second opening through it by which said whistle is operated when said damper is rotated to close the first mentioned opening through said body member.

3. A device of the kind described comprising a body member and a dome member, said body member having an opening through it, means to attach said member to the exhaust manifold of an internal combustion engine, a damper in said opening adapted to close said opening, a shaft having end bearings in the walls of said body member, means to attach said damper to said shaft, a cylindrical whistle member having plugs in the ends thereof, one end of said cylindrical whistle member being attached to said damper shaft and rotating in a bearing in said body member and the other end rotating in the dome as a bearing, one of said plug members having a part thereof cut away to connect with the opening in the whistle member and said body member having an opening therethrough connected with said opening through said plug member, a lock and a connection between said lock and said whistle member whereby said whistle member is operated by said lock.

In testimony whereof I affix my signature.

EARNEST V. COY.